April 23, 1968   M. NIEDEREDER   3,379,976
SWEEP GENERATOR WITH SWEEP LINEARITY CONTROL
Filed Sept. 29, 1965

INVENTOR
*Martin Niedereder*

BY *J. Lee & J. Lee*

ATTYS.

United States Patent Office 3,379,976
Patented Apr. 23, 1968

3,379,976
SWEEP GENERATOR WITH SWEEP
LINEARITY CONTROL
Martin Niedereder, Munich-Solln, Germany, assignor to
Siemens Aktiengesellschaft, a corporation of Germany
Filed Sept. 29, 1965, Ser. No. 491,281
Claims priority, application Germany, Sept. 30, 1964,
S 93,511
6 Claims. (Cl. 325—131)

ABSTRACT OF THE DISCLOSURE

A wobble transmitter with electronic frequency control including a frequency-determining circuit element that is controllable in its characteristic values by means of a periodic wobble voltage with predetermined time sequence, comprising means for producing a variable transmitting frequency, discriminator means for deriving a voltage from the transmitting frequency, means for rectifying the voltage, a sawtooth voltage generator for generating a sawtooth voltage, a differential amplifier responsive to the sawtooth voltage and the rectified voltage for supplying the wobble voltage to the frequency determining circuit element, an adjustable DC source, comparator means responsive to the rectified voltage and the adjustable DC source for generating a marking pulse and an allocated evaluating device responsive to said marking pulse for producing a frequency marker.

---

Figure 1:
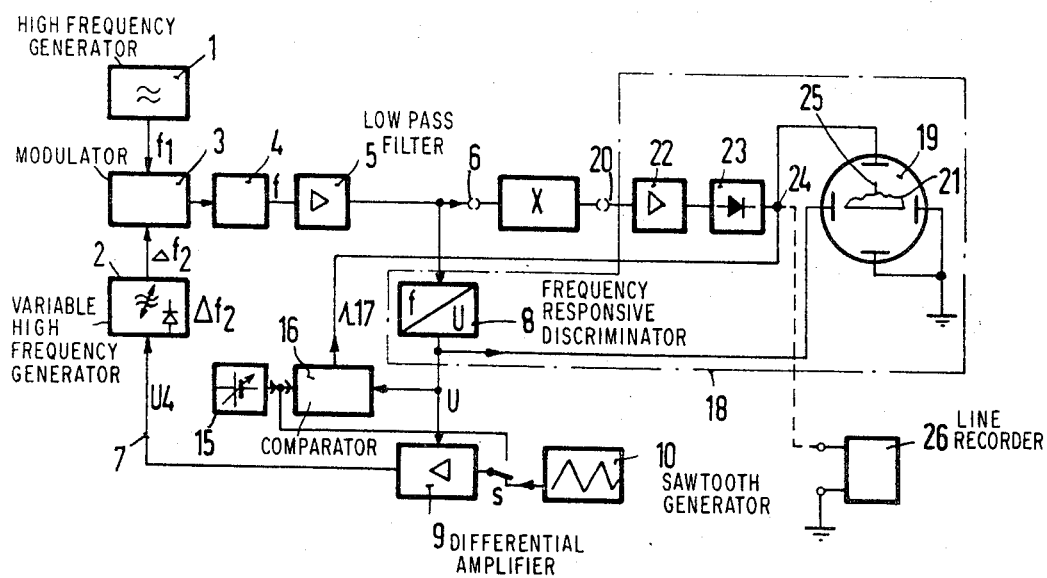

The invention relates to a wobble transmitter with electronic frequency control, in which a frequency determining circuit element (reactance tube, varactor or the like) is controllable in its characteristic values by means of a supplied wobble voltage, in particular a periodic one with predetermined time curve course.

In the known wobble transmitters of this type it is disadvantageous that the inconstancy of the transmitter characteristic values over a long period, which is due largely to characteristic value changes of the electronic frequency control elements, makes necessary a repeated recalibration of the adjusted frequency range. Such frequency inconstancy, in general, leads to changes of the wobble sweep and to displacements of the wobble range, so that conventional stabilization measures in the transmitter circuit proper would be associated with a great circuit expenditure.

The invention solves the problem of practically excluding such inconstancy of wobble transmitters with relatively low circuit expenditure. This is achieved in a wobble transmitter of the type initially mentioned, according to the invention, by an arrangement in which a voltage derived from the transmitting frequency by means of a discriminator, is rectified and conducted with a voltage, generated by a saw-tooth voltage generator, to the inputs of a differential amplifier, with the amplified output voltage being fed as wobble voltage to the frequency-determining circuit element.

An important advantage of a wobble transmitter according to the invention lies in the feature that the frequency precision and constancy of the transmitter output voltage is considerably greater than the frequency precision and constancy of the transmitter circuit proper. Also, in particular, the cut-off frequencies of the wobble sweep are adjustable with great frequency precision and constancy. The discriminator and the saw-tooth voltage generator are so constructed that their characteristic values have great precision and constancy over a long period, which can be realized relatively easily and cheaply within the transmitter circuit, as compared to the conventional stabilization measures. The achievable saving in expenditure becomes still greater in the case of a formation of the wobble transmitter as a beat transmitter, since in this case a frequency precision in the high-frequency part of the transmitter is transferred to the low-frequency output voltage in equal absolute magnitude, with the relative frequency precision being correspondingly increased. There the conventional stabilization measures to be used within the transmitter circuit, that is, in the high-frequency part, would be considerably more expensive than in a direct generation of the output frequency.

Figure 2:
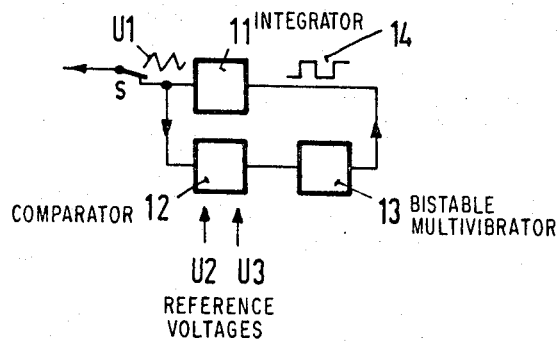

The invention will be explained in detail with the aid of the following description of a preferred circuit example illustrated in the drawing, wherein:

FIGURE 1 is a schematic circuit diagram of a wobble transmitter embodying the invention; and FIGURE 2 is a schematic circuit of a saw-tooth voltage generator.

FIGURE 1 illustrates a wobble transmitter constructed according to the beat principle which consists of a high frequency generator 1 having a constant output frequency $f_1$ and a high frequency generator 2 having a variable output frequency $\Delta f_2$. The output voltages of both high frequency generators are mixed in a modulator 3, in which process a low pass filter 4, connected to outlet side, filters out the differential frequency $f=f_1-\Delta f_2$. The output voltage of frequency $f$ is amplified in an amplifier 5 and fed to the output 6 of the beat transmitter. The wobble range results from the fact that the high-frequency generator 2 is electronically detunable over an adjustable frequency range $\Delta f_2$. The electronic frequency control of this generator takes place by means of a wobble voltage U4, which is supplied over a control line 7 to a frequency-determining electronic circuit element (for example, a reactance tube, varactor or like).

A discriminator 8, connected at the transmitter output 6 and constructed in conventional manner derives from the transmitting frequency $f$ a direct voltage U, the amplitude of which may be utilized as a measure for the instantaneous value of the transmitting frequency. The voltage U is fed to the first input of a differential amplifier 9, to whose second input there is connected the output voltage U1 of a saw-tooth voltage generator 10. In this arrangement the output voltage U4 of the differential amplifier 9, which is proportional to the voltage difference to the two input voltages, is supplied as wobble voltage over the control line 7 to the frequency determining circuit element.

In wobble operation the saw-tooth voltage generator 10 generates an output voltage U1 whose amplitude and sequence frequency are adjustable in a manner known per se. The voltage U1 can here be regarded as a control magnitude of a closed regulating circuit which consists of the circuit elements 9, 7, 2, 3, 4, 5, and 8. The operation of the frequency-determining circuit element, to be considered as an adjusting member of the high-frequency generator 2, takes place automatically in such a manner that the instantaneous value of the discriminator output voltage U is largely equated to the instantaneous value of the voltage U1. These instantaneous values approach each other more and more as the degree of amplification of the differential amplifier 9 becomes greater. Through corresponding adjustment of the positive and/or negative peak values of U1 the magnitude of the wobble range $\Delta f_2$ is established. The position of the wobble range on the frequency axis can be varied in a manner known per se by a bias voltage of adjustable value which is superimposed on the saw-tooth voltage U1.

If the $U/f$ characteristic curve of the discriminator 8 is now formed in such a way that it exactly corresponds to a desired course, for example a linear or logarithmic course, and has a great constancy over a long period, and further, if the saw-tooth voltage generator 10 is constructed with precise and constant characteristic values, a great frequency precision and constancy of the transmitter output voltage at 6 is then achieved, although the transmitter circuit itself has considerably less frequency precision and constancy. It is particularly important here that, through the regulating circuit according to the invention, there are generated with equally great precision and constancy not only the cut-off frequencies of the wobble sweep, but also the transmitting frequencies lying therebetween.

An advantageous form of the saw-tooth voltage generator 10 is illustrated in FIGURE 2. Here, there is provided an integrator 11, for example a Miller integrator, which has a comparator 12 in a feedback branch, to whose inputs there are supplied, on the one hand, the output voltage of the integrator and, on the other hand, two adjustable reference voltages U2 and U3, in which system the comparator, on amplitude equality of the first voltage with one of the two reference voltages, emits, in each case, an output pulse, which is fed to a bistable multivibrator 13. The multivibrator is switched over by each individual output pulse so that it generates on the output side a rectangular voltage 14, which, in turn, is supplied to the input of the integrator 11 as a control voltage. The output voltage U1 of the integrator 11 is here fed to the one input of the differential amplifier 9 illustrated in FIGURE 1. The maximum amplitude fluctuation as well as the direct voltage component of the integrator output voltage U1 can be established by adjustment of the reference voltages U2 and U3, the amplitude difference of the two reference voltages corresponding to the voltage sweep of the integrator output voltage. The flank steepnesses of the integrator output voltage can be altered, for example, by choice of time constants or superimposing a bias voltage of adjustable magnitude on the rectangular voltage 14. In the event the reference voltages U2 and U3 are calibrated in frequency values corresponding to the $U/f$ characteristic curve of the discriminator 8, the cut-off frequencies of the wobble sweep can be directly adjusted therewith.

In FIGURE 1 there is illustrated an adjustable direct voltage source 15, which can be connected, over a switch S at will, to the one input of the differential amplifier 9, in place of the output voltage U1 of the triangular voltage generator 10. If the adjustable direct voltage delivered by this source 15 is likewise calibrated in frequency values corresponding to the $U/f$ characteristic curve of the discriminator 8, for example over a correspondingly calibrated potentiometer, the transmitting frequency $f$ can be manually adjusted with the same precision and constancy as in wobble operation.

In the wobble operation, according to an advantageous further development, the adjustable direct voltage 15, together with the discriminator output voltage U, is fed to a comparator 16, which, at amplitude equality, emits a marking impulse 17. This can be utilized to particular advantage in an allocated recording or viewing device for the formation of a frequency marker, which thus is likewise adjustable with great precision and constancy.

In FIGURE 1 a viewing device 18 is represented which contains a cathode ray tube 19. The input of the viewing device is designated as 20, in which system a four-pole X representing the object to be measured, whose frequency characteristic 21 can be pictorially represented with the aid of this combination consisting of the wobble transmitter and the viewing device 18, is connected between the transmitter output 6 and the input 20. The voltage to be measured, lying on the terminal 20, is amplified in an amplifier 22 and, after rectification in a rectifier 23, is supplied to the vertical deflection device of the cathode ray tube 19, while the horizontal deflection is controlled, for example by the output voltage of a discriminator lying on the measuring frequency. Such discriminator allocated to the viewing apparatus 18, where the wobble transmitter and viewing device 18 are combined at one location, can be constructed similarly to the discriminator belonging to the wobble transmitter illustrated in FIGURE 1. The marker pulses 17 are supplied, for the formation of a frequency marker on the screen of the cathode ray tube 19, to the vertical deflection device at 24. As a result there arises an additional vertical deflection 25 of the electron beam at the point of the frequency characteristic curve 21 to be analyzed. Obviously, it is possible to also effect the frequency marking by means of the pulses 17 in another manner, for example, by a brightness control, known per se, of the electron beam, in which the pulses are fed to a brightness control electrode of the cathode ray tube.

As is indicated in broken lines in FIGURE 1, at 24, a recording device also can be inserted, as, for example, a so-called line recorder 26, whose recording carrier, in operation, is moved past the writing means at a constant speed. If the frequency-time function is to run according to a predetermined, say, logarithmic curve, it is easily possible, through a corresponding deformation of the $U/f$ characteristic curve of the discriminator 8 to set the desired course, so that the recording carrier per se running at a constant advance motion can be correspondingly precalibrated for all frequencies. Expediently the recording carrier receives a preprinted frequency grid, into which the measuring curve is automatically inscribed. In this connection it is merely necessary to take care that the commencement of the advance motion of the recording carrier is synchronized with the commencement of the ascending or descending flank of the output voltage of generator 10. In this last-mentioned automatic recording operation the measuring accuracy is practically as great as in the wobble operation utilizing the viewing device.

The circuit example represented in FIGURE 1 of a wobble transmitter according to the invention can, within the scope of the invention, be modified in several portions of this circuit. Thus, for example, the circuit parts 1, 3, 4 can be omitted, in which case the output of the high frequency generator 2 is directly connected with the input of the amplifier. The transmitting frequency thus is not generated according to the beat principle, but by the generator 3 itself, in which case, for example, this can also be designed for a low-frequency range. The saw-tooth voltage generator 10 can be constructed according to any known circuit principle, as, for example, according to the so-called "bootstrap" circuit.

If in the wobble transmitter according to the invention there is to be achieved an arbitrarily predetermined dependence $f(t)$ of the transmitting frequency $f$ on time $t$, then, with a certain time relation $U1(t)$ of the output voltage $U1$ of the saw-tooth voltage generator 10 the characteristic curve $U/f$ of the discriminator 8 is so selected that the inverse function $f(U)$, applied to the function $U1(t)$ yields the desired relation $f(t)$. Thus there results $$f(t) = fU1(t)$$

There, the above-mentioned function $U1(t)$ is preferably linear.

I claim:

1. A wobble transmitter with electronic frequency control, having a frequency-determining circuit element controllable in its characteristic value by means of a periodic wobble voltage with predetermined time sequence and with alternating ascending and descending flanks, comprising means for producing a variable transmitting frequency, discriminator means connected to the output terminals of said means for producing a transmitting frequency for deriving a DC voltage from said transmitting frequency, the amplitude of said DC voltage being solely dependent on the value of the transmitting frequency, wobble voltage generator means for generating said wobble voltage, a differential amplifier connected with the output of said frequency discriminator means and said wobble voltage generator means for amplifying the difference between said DC voltage and said wobble voltage, said difference being applied to said frequency-determining circuit element as a control voltage for controlling said characteristic value, said circuit element being part of said means for producing a transmitting frequency, means for producing an adjustable DC voltage calibrated in values of the transmitting frequency, in correspondence to the characteristic curve of said frequency discriminator means, comparator means responsive to an amplitude equality of said adjustable DC voltage and said DC voltage for generating a marking pulse, and an allocated evaluating device responsive to said marking pulse for producing a frequency marker.

2. A wobble transmitter according to claim 1, comprising a change-over switch for alternatively connecting said adjustable DC voltage and said wobble voltage with said differential amplifier.

3. A wobble transmitter according to claim 1, comprising in further combination, a second transmitter for producing a constant output frequency and modulator means for mixing said constant output frequency with said transmitting frequency.

4. A wobble transmitter according to claim 1, wherein said evaluating device comprises writing means which are deflected dependent on time, said writing means being controlled by said DC voltage derived from said transmitting frequency.

5. A wobble transmitter according to claim 1, wherein said evaluating device takes the form of a level meter which contains a line recorder.

6. A wobble transmitter according to claim 1, wherein the characteristic curve of the frequency discriminator is selected in accordance with a previously established logarithmic dependence of the transmitting frequency with time.

References Cited

UNITED STATES PATENTS

| 2,596,167 | 5/1952 | Philpott | 328—185 |
| 2,927,279 | 3/1960 | Smith-Vance | 331—4 |
| 3,047,820 | 7/1962 | Lawton | 331—143 |

FOREIGN PATENTS

| 149,462 | 1962 | U.S.S.R. |

OTHER REFERENCES

Hewlett-Packard Journal; vol. 15, No. 4, Dec., 1963, 8 pp.

ROBERT L. GRIFFIN, *Primary Examiner.*

JOHN W. CALDWELL, *Examiner.*

B. V. SAFOUREK, *Assistant Examiner.*